US010694180B2

(12) United States Patent
Han et al.

(10) Patent No.: US 10,694,180 B2
(45) Date of Patent: *Jun. 23, 2020

(54) ENTROPY CODING TRANSFORM PARTITIONING INFORMATION

(71) Applicant: GOOGLE LLC, Mountain View, CA (US)

(72) Inventors: Jingning Han, Santa Clara, CA (US); Yaowu Xu, Saratoga, CA (US)

(73) Assignee: GOOGLE LLC, Moutain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/939,691

(22) Filed: Mar. 29, 2018

(65) Prior Publication Data
US 2018/0220128 A1    Aug. 2, 2018

Related U.S. Application Data

(63) Continuation of application No. 15/044,233, filed on Feb. 16, 2016, now Pat. No. 9,942,548.

(51) Int. Cl.
*H04N 19/176* (2014.01)
*H04N 19/115* (2014.01)
(Continued)

(52) U.S. Cl.
CPC .......... *H04N 19/115* (2014.11); *H04N 19/13* (2014.11); *H04N 19/157* (2014.11);
(Continued)

(58) Field of Classification Search
None
See application file for complete search history.

(56) References Cited

U.S. PATENT DOCUMENTS 9,942,548 B2 *   4/2018   Han ................... H04N 19/115
2012/0230411 A1   9/2012   Liu et al.
(Continued)

OTHER PUBLICATIONS

Bankoski, et al., "Technical Overview of VP8, An Open Source Video Codec for the Web", Jul. 11, 2011, 6 pp.
(Continued)

*Primary Examiner* — Christopher G Findley
(74) *Attorney, Agent, or Firm* — Young Basile Hanlon & MacFarlane, P.C.

(57) ABSTRACT

Entropy coding of transform partitioning information may include decoding a current block by determining a probability for entropy decoding a transform partitioning flag based on a transform block size of an adjacent block that is available for decoding, entropy decoding the transform partitioning flag for the current block using the probability, generating a reconstructed block based on the current block by, on a condition that the transform partitioning flag indicates that transform partitioning is omitted for the current block, inverse transforming the current block using a current block size inverse transform, and, on a condition that the transform partitioning flag indicates transform partitioning for the current block, identifying sub-blocks from the current block, wherein each sub-block from the sub-blocks has a sub-block size smaller than the current block size, inverse transforming the sub-blocks using sub-block size inverse transforms, and generating the reconstructed block based on the residual block.

19 Claims, 8 Drawing Sheets

(51) Int. Cl.
*H04N 19/60* (2014.01)
*H04N 19/91* (2014.01)
*H04N 19/157* (2014.01)
*H04N 19/13* (2014.01)

(52) U.S. Cl.
CPC .......... *H04N 19/176* (2014.11); *H04N 19/60* (2014.11); *H04N 19/91* (2014.11)

(56) References Cited

U.S. PATENT DOCUMENTS

| | | | | |
|---|---|---|---|---|
| 2013/0039422 | A1* | 2/2013 | Kirchhoffer | H04N 19/52 375/240.13 |
| 2013/0188731 | A1* | 7/2013 | Kim | H04N 19/70 375/240.18 |
| 2013/0188884 | A1* | 7/2013 | Kim | H04N 19/176 382/233 |
| 2013/0315303 | A1 | 11/2013 | Min et al. | |
| 2014/0050266 | A1* | 2/2014 | Zhang | H04N 19/122 375/240.18 |
| 2014/0192904 | A1* | 7/2014 | Rosewarne | H04N 19/60 375/240.29 |
| 2015/0110199 | A1* | 4/2015 | Ikai | H04N 19/91 375/240.18 |
| 2016/0219276 | A1* | 7/2016 | Li | H04N 19/13 |
| 2017/0201773 | A1* | 7/2017 | Tokumitsu | H04N 19/119 |

OTHER PUBLICATIONS

Bankoski et al, "VP8 Data Format and Decoding Guide", Independent Submission RFC 6389, Nov. 2011, 305 pp.
Bankoski et al, "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

* cited by examiner

ENTROPY CODING TRANSFORM PARTITIONING INFORMATION

CROSS-REFERENCE TO RELATED APPLICATION(S)

This disclosure is a continuation of U.S. patent application Ser. No. 15/044,233, filed Feb. 16, 2016, which is incorporated by reference herein in its entirety.

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide high resolution video transmitted over communications channels having limited bandwidth, such as video coding using entropy coding of transform partitioning information.

SUMMARY

This application relates to encoding and decoding of video stream data for transmission or storage. Disclosed herein are aspects of systems, methods, and apparatuses for entropy encoding and decoding transform partitioning information.

An aspect is a method for decoding a current block from a current frame from an encoded video stream. The method includes determining, based on a transform block size of an adjacent block available for decoding the current block, a probability for entropy decoding a transform partitioning flag associated with the current block. The method further includes entropy decoding the transform partitioning flag using the probability. The method further includes subsequent to entropy decoding the transform partitioning flag using the probability, generating a reconstructed block based on the current block. The method further includes outputting the reconstructed block within an output video stream.

Another aspect is an apparatus for decoding a current block from a current frame from an encoded video stream. The apparatus includes a memory and a processor configured to execute instructions stored in the memory. The instructions include instructions to determine, based on a transform block size of an adjacent block available for decoding the current block, a probability for entropy decoding a transform partitioning flag associated with the current block. The instructions include instructions to entropy decode the transform partitioning flag using the probability. The instructions include instructions to subsequent to entropy decoding the transform partitioning flag using the probability, generate a reconstructed block based on the current block. The instructions include instructions to output the reconstructed block within an output video stream.

Another aspect is an apparatus. The apparatus includes a memory and a processor configured to execute instructions stored in the memory. The instructions include instructions to determine whether a transform partitioning flag for a current block indicates transform partitioning for the current block, wherein the current block is a residual block from a current frame of an encoded video stream. The instructions include instructions to, responsive to a determination that the transform partitioning flag for the current block indicates transform partitioning for the current block: identify sub-blocks from the current block, wherein each sub-block from the sub-blocks has a respective sub-block size that is smaller than a size of the current block; and generate a reconstructed block by multiform transform partition coding at least some of the sub-blocks using each respective sub-block of the sub-blocks as the current block. The instructions include instructions to, responsive to a determination that the transform partitioning flag for the current block indicates that transform partitioning is omitted for the current block: generate the reconstructed block by inverse transforming transform coefficients decoded from the encoded video stream for the current block, wherein the inverse transforming includes using a current block size inverse transform. The instructions include instructions to output the reconstructed block within an output video stream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
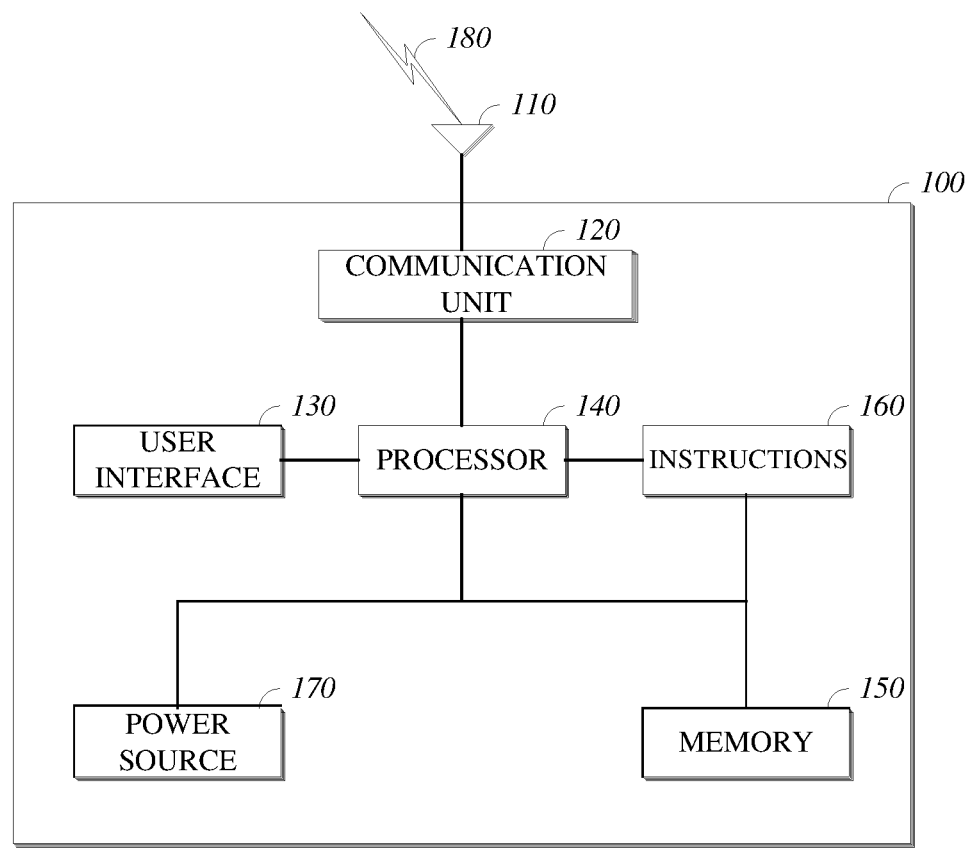
FIG. 1 is a diagram of a computing device in accordance with implementations of this disclosure.

Video compression schemes may include breaking each image, or frame, into smaller portions, such as blocks, and generating an output bitstream using techniques to limit the information included for each block in the output. An encoded bitstream can be decoded to re-create the blocks and the source images from the limited information. In some implementations, the information included for each block in the output may be limited by reducing spatial redundancy, reducing temporal redundancy, or a combination thereof. For example, temporal or spatial redundancies may be reduced by predicting a frame based on information available to both the encoder and decoder, and including information representing a difference, or residual, between the predicted frame and the original frame. The residual information may be further compressed by transforming the residual information into transform coefficients. In some implementations, transforming the residual information may include determining a uniform transform size for transforming the residual information, such as a transform size equivalent to the size of the residual information, or a uniform transform size smaller than the size of the residual information. However, in some implementations, using a uniform transform size be inefficient.

In some implementations, video coding may include determining a multiform transform size for transforming the residual information to minimize encoding costs. For example, using multiform transform sizes may include determining one or more transform sizes for transforming the residual information by recursively determining whether a cost for using a current block size transform exceeds a cost for partitioning the current block into sub-blocks and encoding using sub-block size transforms. If the cost for encoding using sub-block size transforms is smaller, repeating the determination for each sub-block using the sub-block size as the current block size and using a smaller sub-block size as the sub-block size. In some implementations, for a current block, a partitioning flag may be included in the bitstream to indicate whether the transform partitioning applies for the current block.

In some implementations, the cost of indicating the transform partitioning information in the bitstream may be reduced by entropy coding the transform partitioning flag. In some implementations, entropy coding the transform partitioning flag may include determining an entropy coding probability distribution for entropy coding the transform partitioning flag. In some implementations, an entropy coding probability distribution for entropy coding a transform partitioning flag may be identified based on the transform size used for encoding another block, such as a previously coded block adjacent to the current block. For example, the transform size used for encoding a previously coded block adjacent to the current block may be the current block size, and a first probability distribution may be used; the transform size used for encoding a previously coded block adjacent to the current block may be smaller than the current block size, and a second probability distribution may be used; or the transform size used for encoding two previously coded blocks adjacent to the current block may be smaller than the current block size, and a third probability distribution may be used.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a special purpose processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
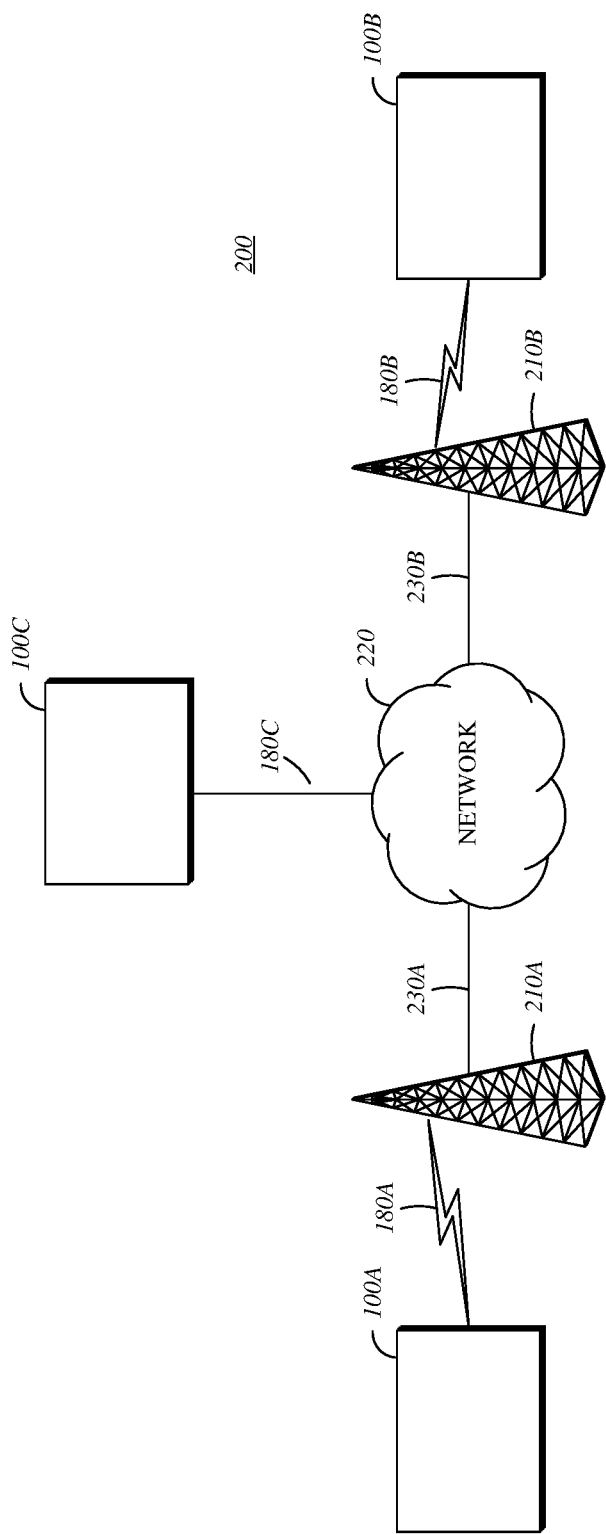
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
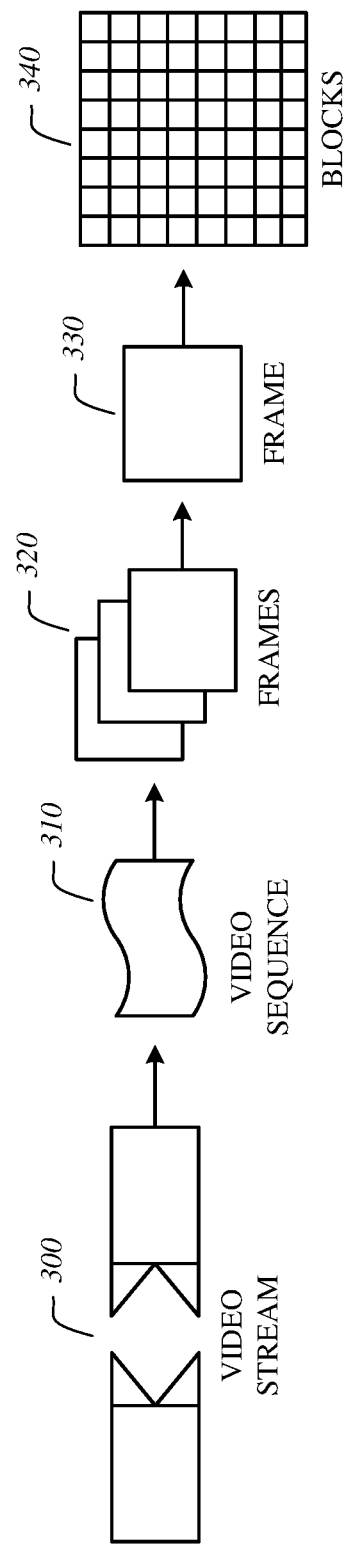
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
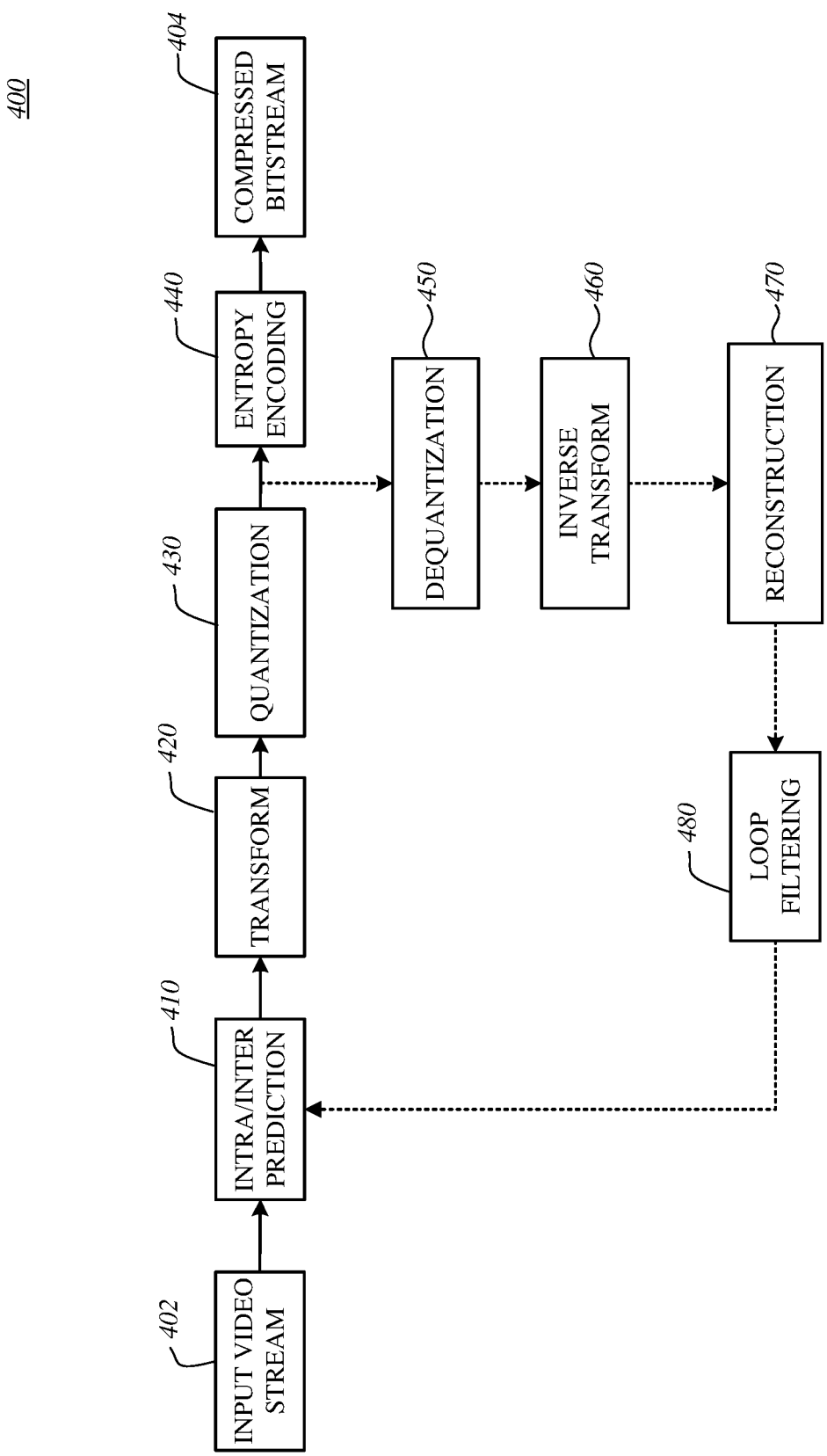
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
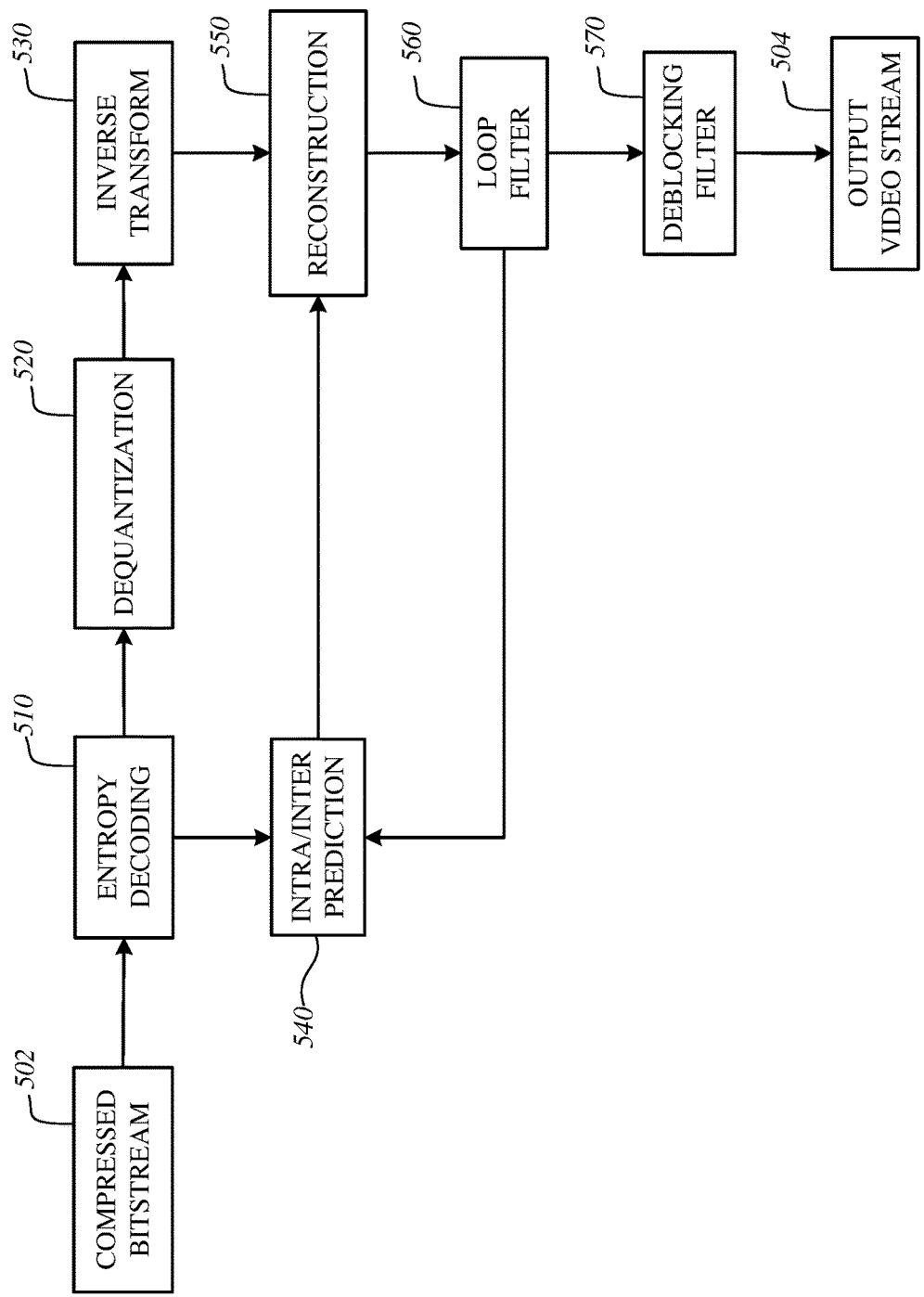
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
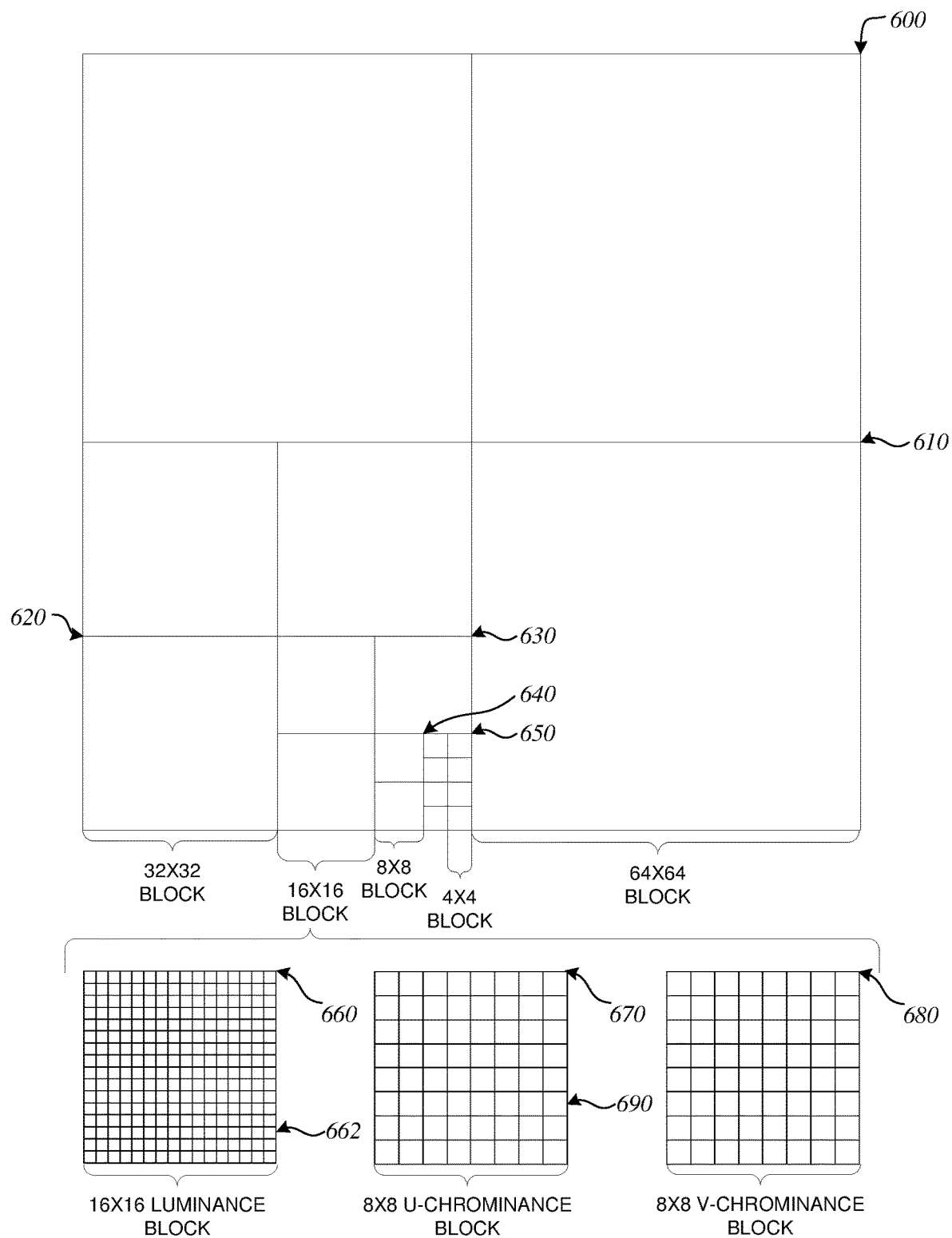
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670/680, such as a U or Cb chrominance block 670, and a V or Cr chrominance block 680. The chrominance blocks 670/680 may include chrominance pixels 690. For example, the luminance block 660 may include 16×16 luminance pixels 662 and each chrominance block 670/680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a block or pixel in a reference frame, or a portion of the reference frame, that corresponds with a current block or pixel of a current frame. For example, a reference frame, or a portion of a reference frame, which may be stored in memory, may be searched for the best block or pixel to use for encoding a current block or pixel of the current frame. For example, the search may identify the block of the reference frame for which the difference in pixel values between the reference block and the current block is minimized, and may be referred to as motion searching. In some implementations, the portion of the reference frame searched may be limited. For example, the portion of the reference frame searched, which may be referred to as the search area, may include a limited number of rows of the reference frame. In an example, identifying the reference block may include calculating a cost function, such as a sum of absolute differences (SAD), between the pixels of the blocks in the search area and the pixels of the current block.

In some implementations, the spatial difference between the location of the reference block in the reference frame and the current block in the current frame may be represented as a motion vector. The difference in pixel values between the reference block and the current block may be referred to as differential data, residual data, or as a residual block. In some implementations, generating motion vectors may be referred to as motion estimation, a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two dimensional data structure such as a matrix as shown, or in a one dimensional data structure, such as a vector array. In an implementation, a representation of the frame, such as a two dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties, and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition.

For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 partitions 620, and multiform transform partition coding each partition.

In some implementations, determining whether to transform partition the current block may be based on comparing a cost for encoding the current block using a current block size transform to a sum of costs for encoding each partition using partition size transforms.

For example, for the bottom-left 64×64 block 610 shown, the cost for encoding the 64×64 block 610 using a 64×64 size transform may exceed the sum of the costs for encoding four 32×32 sub-blocks 620 using 32×32 transforms. The cost for encoding the top left 32×32 sub-block 620 using a 32×32 transform may be less than a sum of the cost for encoding the top left 32×32 sub-block 620 using four 16×16 transforms, and the top left 32×32 sub-block 620 may be coded using a 32×32 transform. Similarly, the cost for encoding the top right 32×32 sub-block 620 using a 32×32 transform may be less than a sum of the cost for encoding the top right 32×32 sub-block 620 using four 16×16 transforms, and the top right 32×32 sub-block 620 may be coded using a 32×32 transform. Similarly, the cost for encoding the bottom left 32×32 sub-block 620 using a 32×32 transform may be less than a sum of the cost for encoding the bottom left 32×32 sub-block 620 using four 16×16 transforms, and the bottom left 32×32 sub-block 620 may be coded using a 32×32 transform. The cost for encoding the bottom right 32×32 sub-block 620 using a 32×32 transform may exceed a sum of the cost for encoding the bottom right 32×32 sub-block 620 using four 16×16 transforms, and the bottom right 32×32 sub-block 620 may be partitioned into four 16×16 sub-blocks 630, and each 16×16 sub-block 630 may be coded using multiform transform partition coding.

For example, for the top left 16×16 block 630 shown, the cost for encoding the 16×16 block 630 using a 16×16 size transform may exceed the sum of the costs for encoding four 8×8 sub-blocks 640 using 8×8 transforms. The cost for encoding the top right 16×16 block 630 using a 16×16 transform may be less than a sum of the cost for encoding the top right 16×16 block 630 using four 8×8 transforms, and the top right 16×16 block 630 may be coded using a 16×16 transform. Similarly, the cost for encoding the bottom left 16×16 block 630 using a 16×16 transform may be less than a sum of the cost for encoding the bottom left 16×16 block 630 using four 8×8 transforms, and the bottom left 16×16 block 630 may be coded using a 16×16 transform. The cost for encoding the bottom right 16×16 block 630 using a 16×16 transform may exceed a sum of the cost for encoding the bottom right 16×16 block 630 using four 8×8 transforms, and the bottom right 16×16 block 630 may be partitioned into four 8×8 sub-blocks 640, and each 8×8 sub-block 640 may be coded using multiform transform partition coding.

For example, for the top left 8×8 sub-block 640 shown, the cost for encoding the 8×8 sub-block 640 using an 8×8 size transform may exceed the sum of the costs for encoding four 4×4 sub-blocks 650 using 4×4 transforms. The cost for encoding the top right 8×8 sub-block 640 using an 8×8 transform may be less than a sum of the cost for encoding the top right 8×8 sub-block 640 using four 4×4 transforms, and the top right 8×8 sub-block 640 may be coded using an 8×8 transform. Similarly, the cost for encoding the bottom left 8×8 sub-block 640 using an 8×8 transform may be less than a sum of the cost for encoding the bottom left 8×8 sub-block 640 using four 4×4 transforms, and the bottom left 8×8 sub-block 640 may be coded using an 8×8 transform. The cost for encoding the bottom right 8×8 sub-block 640 using an 8×8 transform may exceed a sum of the cost for encoding the bottom right 8×8 block 640 using four 4×4 transforms, and the bottom right 8×8 sub-block 640 may be partitioned into four 4×4 sub-blocks 650, and each 4×4 sub-block 650 may be coded using multiform transform partition coding. In some implementations, the sub-block size may be a minimum transform size, such as 4×4 and multiform transform partition coding may include identifying the minimum transform size as the transform size for encoding the sub-blocks.

Figure 7:
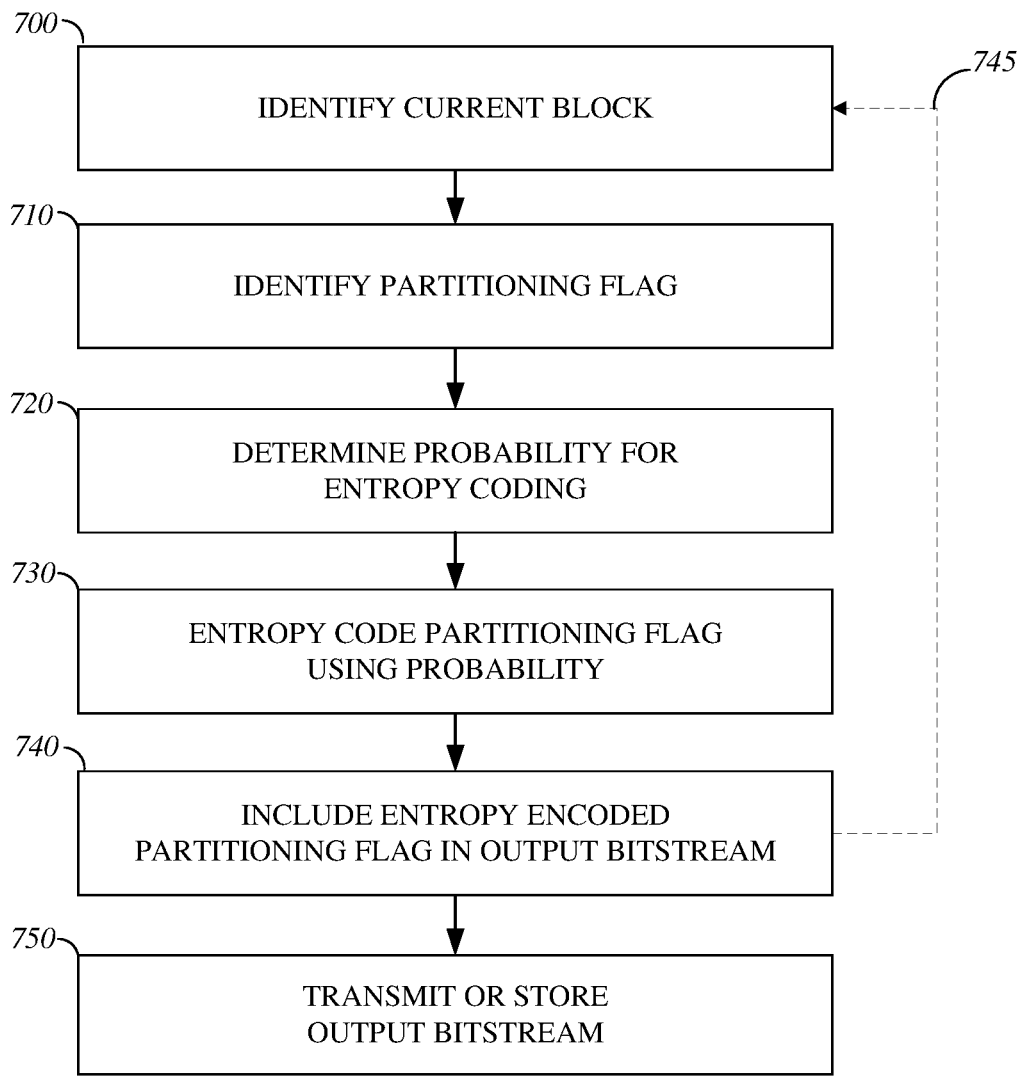
FIG. 7 is a flowchart diagram of encoding a residual block including entropy encoding transform partitioning flags in accordance with implementations of this disclosure.

FIG. 7 is a flowchart diagram of encoding a residual block including entropy encoding transform partitioning flags in accordance with implementations of this disclosure. In some implementations, encoding transform partitioning flags may be implemented in an encoder, such as the encoder 400 shown in FIG. 4. In some implementations, entropy encoding transform partitioning flags may include identifying a current block at 700, identifying a partitioning flag at 710, determining a probability index at 720, entropy encoding the partitioning flag at 730, including entropy encoded partitioning flags at 740, and transmitting or storing a transform block at 750, or any combination thereof.

In some implementations, a current block may be identified at 700. In some implementations, the current block may be a residual block, or a partition thereof, encoded using multiform transform partition coding as described herein. For example, the current block may be identified as a 64×64 residual block, such as the bottom-left 64×64 residual block 610 shown in FIG. 6. In another example, the current block may be identified as a sub-block of a residual block, such as the bottom left 32×32 block 620 shown in FIG. 6, the bottom left 16×16 sub-block 630 shown in FIG. 6, the bottom left 8×8 sub-block 640 shown in FIG. 6, or the bottom left 4×4 sub-block 650 shown in FIG. 6.

In some implementations, a transform partitioning flag may be identified 710 for the current block identified at 700. For example, multiform transform partition coding a residual block as shown in FIG. 6 may include generating a transform partitioning flag indicating whether multiform transform partition coding includes transform partitioning the current block. For example, the current block identified at 700 may be a 64×64 residual block, such as the top-left 64×64 block 610 shown in FIG. 6, multiform transform partition coding may include determining to encode the 64×64 current block using a 64×64 transform, and a transform partitioning flag value indicating that transform partitioning is omitted for the current block, such as a transform partitioning flag value of zero, may be identified for the current block.

In another example, the current block identified at 700 may be a 64×64 residual block, such as the bottom-left 64×64 block 610 shown in FIG. 6, multiform transform partition coding may include determining to encode the 64×64 current block using transform partitioning, and a transform partitioning flag value indicating that transform partitioning is included for the current block, such as a transform partitioning flag value of one, may be identified for the current block. In another example, the current block identified at 700 may be a 16×16 residual block, such as the bottom-right 16×16 block 630 shown in FIG. 6, multiform transform partition coding may include determining to encode the 16×16 current block using transform partitioning, and a transform partitioning flag value indicating that transform partitioning is included for the current block, such as a transform partitioning flag value of one, may be identified for the current block. In some implementations, the current block identified at 700 may have a block size equivalent to a minimum transform size, and identifying a transform partitioning flag at 710 may be omitted.

In some implementations, an entropy coding probability for entropy encoding the transform partitioning flag identified at 710 may be determined at 720. In some implementations, the entropy coding probability may be determined from among multiple transform partitioning flag entropy coding probability distributions. In some implementations, determining the transform partitioning flag entropy coding probability at 720 may include determining a transform partitioning flag entropy coding probability index, and identifying the probability based on the transform partitioning flag entropy coding probability index, such as by using the transform partitioning flag entropy coding probability index as an index into a table.

In some implementations, the transform partitioning flag entropy coding probability index may be determined based on one or more context blocks available for entropy coding the current block, such as one or more previously encoded blocks adjacent to the current block. For example, the current block may be the bottom-right 64×64 block 610 shown in FIG. 6 and the available context blocks may include one or more of the top-right 64×64 block 610, the top-right 32×32 block 620, the top-right 16×16 block 630, and the four right-most 4×4 blocks 650.

In some implementations, zero context blocks may be available for entropy coding the current block and a first transform partitioning flag entropy coding probability index, such as zero (0), may be identified as the transform partitioning flag entropy coding probability index. In some implementations, one context block may be available for entropy coding the current block, the transform size for the context block may be the current block size or larger, and the first transform partitioning flag entropy coding probability index, zero (0), may be identified as the transform partitioning flag entropy coding probability index. In some implementations, one context block may be available for entropy coding the current block, the transform size for the context block may be smaller than the current block size, and a second transform partitioning flag entropy coding probability index, such as one (1), may be identified as the transform partitioning flag entropy coding probability index.

In some implementations, two context blocks, such as one context block above the current block and one context block to the left of the current block, may be available for entropy coding the current block, the transform size for each of the available context blocks may the current block size or larger, and the first transform partitioning flag entropy coding probability index, zero (0), may be identified as the transform partitioning flag entropy coding probability index. In some implementations, two context blocks, such as one context block above the current block and one context block to the left of the current block, may be available for entropy coding the current block, the transform size for one of the available context blocks may be the current block size or larger and the transform size for the other available context block may be smaller than the current block size, and the second transform partitioning flag entropy coding probability index, one (1), may be identified as the transform partitioning flag entropy coding probability index. In some implementations, two context blocks, such as one context block above the current block and one context block to the left of the current block, may be available for entropy coding the current block, the transform size for each of the available context blocks may be smaller than the current block size, and a third transform partitioning flag entropy coding probability index, two (2), may be identified as the transform partitioning flag entropy coding probability index.

In some implementations, the transform partitioning flag identified at 710 for the current block identified at 700 may be entropy coded using the entropy coding probability identified at 720. In some implementations, the entropy encoded transform probability flag encoded at 730 may be included in an output bitstream at 740, such as the output bitstream 404 shown in FIG. 4.

In some implementations, the current block may be a sub-block, and identifying a current block at 700, identifying a transform partitioning flag at 710, determining a probability index at 720, entropy encoding the partitioning flag at 730, and including entropy encoded partitioning flags at 740 may be performed for each other sub-block having the current block size as shown by the broken line at 745.

In some implementations, the transform partitioning flag identified at 710 for the current block identified at 700 may indicate transform partitioning for the current block and identifying a current block at 700, identifying a transform partitioning flag at 710, determining a probability index at 720, entropy encoding the partitioning flag at 730, and including entropy encoded partitioning flags at 740 may be performed for each sub-block of the current block, which is also indicated by the broken line at 745.

For example, a 64××64 residual block may be transform partitioned as shown at the bottom-left 64×64 block 610 in FIG. 6, which may include a first transform partitioning flag indicating transform partitioning for the 64×64 block, a second transform partitioning flag indicating no transform partitioning for the top-left 32×32 block, a third transform partitioning flag indicating no transform partitioning for the top-right 32×32 block, a fourth transform partitioning flag indicating no transform partitioning for the bottom-left 32×32 block, a fifth transform partitioning flag indicating transform partitioning for the bottom-right 32×32 block, a sixth transform partitioning flag indicating no transform partitioning for the top-left 16×16 block, a seventh transform partitioning flag indicating no transform partitioning for the top-right 16×16 block, an eight transform partitioning flag indicating no transform partitioning for the bottom-left 16×16 block, a ninth transform partitioning flag indicating transform partitioning for the bottom-right 16×16 block, a tenth transform partitioning flag indicating no transform partitioning for the top-left 8×8 block, an eleventh transform partitioning flag indicating transform partitioning for the top-right 8×8 block, a twelfth transform partitioning flag indicating no transform partitioning for the bottom-left 8×8 block, and a thirteenth transform partitioning flag indicating transform partitioning for the bottom-right 8×8 block.

In some implementations, the output bitstream may be transmitted or stored at 750. For example, the output may be transmitted to another device, such as the decoder 500 shown in FIG. 5, via a wired or wireless communication system, such as the wireless network shown in FIG. 2.

Figure 8:
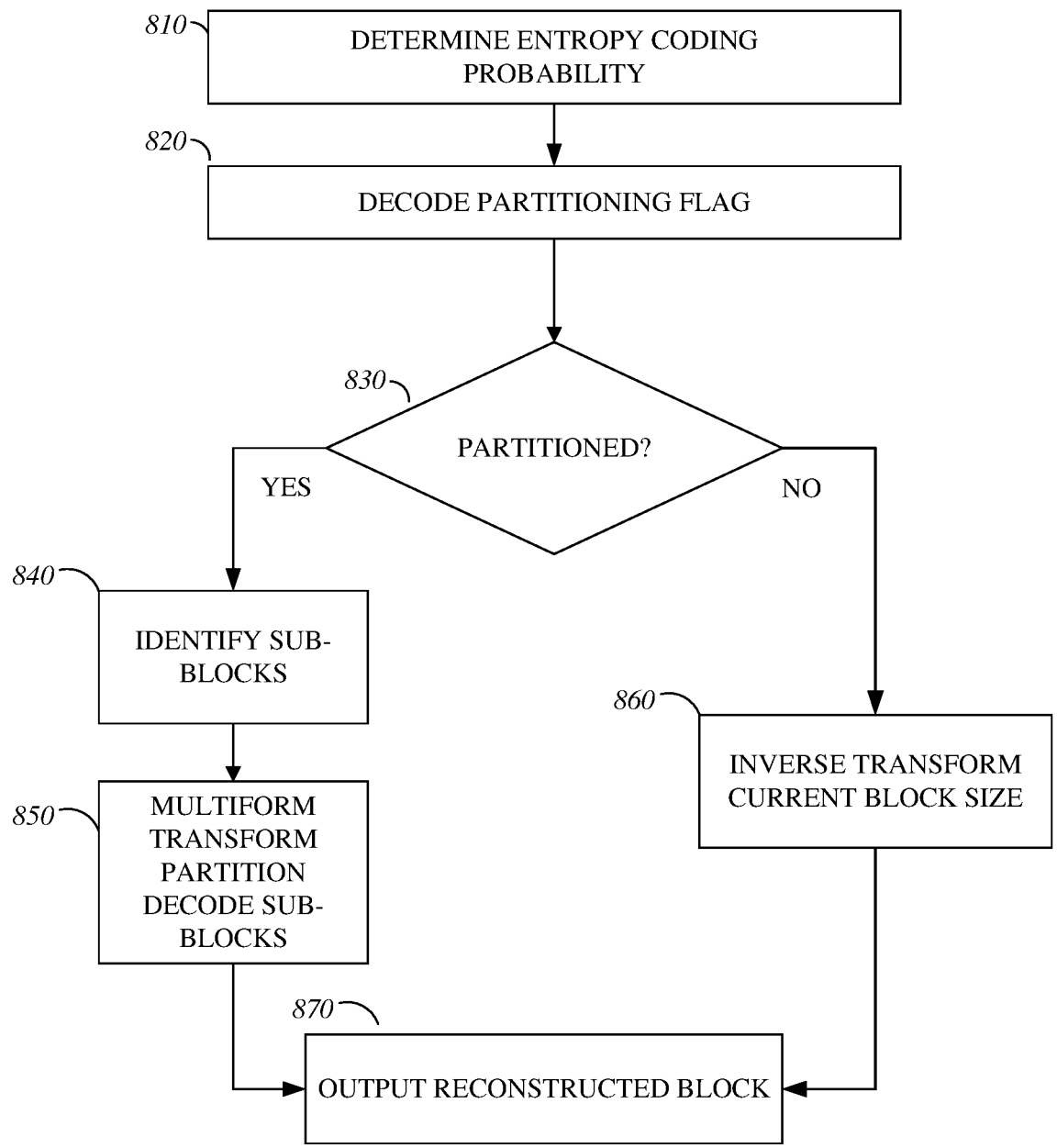
FIG. 8 is a flowchart diagram of entropy decoding a residual block including entropy decoding transform partitioning flags in accordance with implementations of this disclosure.

FIG. 8 is a flowchart diagram of entropy decoding a residual block including entropy decoding transform partitioning flags in accordance with implementations of this disclosure. In some implementations, decoding a residual block may be implemented in a decoder, such as the decoder 500 shown in FIG. 5. In some implementations, a residual block may be encoded using multiform transform partition coding as shown in FIG. 7, and the encoded residual block may be decoded using multiform transform partition decoding. In some implementations, multiform transform partition decoding a current encoded block may include determining an entropy decoding probability at 810, decoding a transform partitioning flag at 820, determining whether the current block is transform partitioned at 830, identifying sub-blocks at 840, multiform transform partition decoding the sub-blocks at 850, inverse transforming the current block at 860, outputting the residual block at 870, or any combination thereof. Although not shown separately in FIG. 8, in some implementations, multiform transform partition decoding may include identifying a current block, such as a current residual block.

In some implementations, entropy coding probabilities for entropy decoding an entropy coded transform partitioning flag for the current block may be identified at 810. In some implementations, identifying the transform partitioning flag entropy coding probabilities at 810 may include determining a transform partitioning flag entropy coding probability index, and identifying the probabilities based on the transform partitioning flag entropy coding probability index, such as by using the transform partitioning flag entropy coding probability index as an index into a table.

In some implementations, identifying the transform partitioning flag entropy coding probability index may include identifying one or more context blocks available for entropy decoding the current block, such as one or more previously decoded blocks adjacent to the current block. For example, the current block may be the bottom-right 64×64 block 610 shown in FIG. 6 and the available context blocks may include one or more of the top-right 64×64 block 610, the top-right 32×32 block 620, the top-right 16×16 block 630, and the four right-most 4×4 blocks 650.

In some implementations, zero context blocks may be available for entropy decoding the current block and a first transform partitioning flag entropy coding probability index, such as zero (0), may be identified as the transform partitioning flag entropy coding probability index. In some implementations, one context block may be available for entropy decoding the current block, the transform size for the context block may be the current block size or larger, and the first transform partitioning flag entropy coding probability index, zero (0), may be identified as the transform partitioning flag entropy coding probability index. In some implementations, one context block may be available for entropy decoding the current block, the transform size for the context block may be smaller than the current block size, and a second transform partitioning flag entropy coding probability index, such as one (1), may be identified as the transform partitioning flag entropy coding probability index.

In some implementations, two context blocks, such as one context block above the current block and one context block to the left of the current block, may be available for entropy decoding the current block, the transform size for each of the available context blocks may the current block size or larger, and the first transform partitioning flag entropy coding probability index, zero (0), may be identified as the transform partitioning flag entropy coding probability index. In some implementations, two context blocks, such as one context block above the current block and one context block to the left of the current block, may be available for entropy decoding the current block, the transform size for one of the available context blocks may be the current block size or larger and the transform size for the other available context block may be smaller than the current block size, and the second transform partitioning flag entropy coding probability index, one (1), may be identified as the transform partitioning flag entropy coding probability index. In some implementations, two context blocks, such as one context block above the current block and one context block to the left of the current block, may be available for entropy decoding the current block, the transform size for each of the available context blocks may be smaller than the current block size, and a third transform partitioning flag entropy coding probability index, two (2), may be identified as the transform partitioning flag entropy coding probability index.

In some implementations, a transform partitioning flag for the current block may be decoded at 820. For example, the transform probability flag may be entropy decoded from the encoded bitstream using the entropy coding probability identified at 810.

In some implementations, it may be determined whether the current block is transform partitioned at 830. For example, the transform partitioning flag entropy decoded at 820 may indicate that the current block was encoded using transform partitioning, or may indicate that encoding the current block omitted transform partitioning the current block.

In some implementations, the transform partitioning flag entropy decoded at 820 may indicate that the current block was encoded using transform partitioning and partitions, or sub-blocks, from the current block may be identified at 840, and multiform transform partition decoding may be performed for each sub-block at 850.

In some implementations, the transform partitioning flag entropy decoded at 820 may indicate that encoding the current block omitted transform partitioning the current block, and the current block may be inverse transformed using a current block size transform at 860.

In some implementations, a reconstructed block may be generated at 870 using the inverse transformed residual block generated at 860, and the reconstructed block may be included in an output for storage or presentation at 870.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a computer program that, when executed, carries out any of the respective methods, algorithms and/or instructions described herein. In addition or alternatively, for example, a special purpose computer/ processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method for decoding a current block from a current frame from an encoded video stream, the method comprising:
    determining, based on a transform block size of an adjacent block available for decoding the current block, a probability for entropy decoding a transform partitioning flag associated with the current block, wherein the transform partitioning flag indicates either transform partitioning for the current block or that transform partitioning is omitted for the current block, and determining the probability for entropy decoding the transform partitioning flag associated with the current block includes selecting the probability from a lookup table based on a transform partitioning flag entropy coding index value;
    entropy decoding the transform partitioning flag using the probability;
    subsequent to entropy decoding the transform partitioning flag using the probability, generating a reconstructed block based on the current block; and
    outputting the reconstructed block within an output video stream.

2. The method of claim 1, wherein the transform partitioning flag indicates transform partitioning for the current block, wherein generating the reconstructed block based on the current block includes:
    generating a residual block by inverse transforming transform coefficients decoded from the encoded video stream for respective sub-blocks from the current block, wherein each sub-block of the respective sub-blocks has a sub-block size that is smaller than a size of the current block, wherein the inverse transforming includes using sub-block size inverse transforms; and
    generating the reconstructed block based on the residual block.

3. The method of claim 2, wherein generating the reconstructed block based on the current block includes:
    determining a second probability for entropy decoding a second transform partitioning flag for a current sub-block from the sub-blocks, based on a second transform block size of a second adjacent block that is available for decoding the current sub-block;

entropy decoding the second transform partitioning flag from the encoded video stream using the second probability;

generating a reconstructed sub-block based on the current sub-block; and including the reconstructed sub-block in the reconstructed block.

4. The method of claim 3, wherein the second transform partitioning flag indicates transform partitioning for the current block sub-block, wherein generating the reconstructed sub-block based on the current sub-block includes:

identifying second sub-blocks from the current sub-block, wherein each sub-block from the second sub-blocks has a respective second sub-block size that is smaller than the sub-block size;

generating the residual block by inverse transforming transform coefficients decoded from the encoded video stream for the respective sub-blocks from the second sub-blocks, wherein the inverse transforming includes using second sub-block size inverse transforms; and generating the reconstructed sub-block based on the residual block.

5. The method of claim 3, wherein the second transform partitioning flag indicates that transform partitioning is omitted for the current block sub-block, wherein generating the reconstructed sub-block based on the current sub-block includes:

generating the residual block by inverse transforming transform coefficients decoded from the encoded video stream for the current sub-block using a sub-block size inverse transform; and generating the reconstructed sub-block based on the residual block.

6. The method of claim 1, wherein the transform partitioning flag indicates that transform partitioning is omitted for the current block, wherein generating the reconstructed block based on the current block includes:

generating a residual block by inverse transforming transform coefficients decoded from the encoded video stream for the current block, wherein the inverse transforming includes using a current block size inverse transform; and generating the reconstructed block based on the residual block.

7. The method of claim 1, wherein determining the probability for entropy decoding the transform partitioning flag associated with the current block includes:

identifying the probability based on a comparison of the transform block size and a size of the current block.

8. The method of claim 1, wherein the transform block size of the adjacent block is a first transform block size of a first adjacent block, wherein determining the probability for entropy decoding the transform partitioning flag associated with the current block includes:

identifying the probability based on a comparison of the first transform block size, a second transform block size of a second adjacent block available for decoding the current block, and a size of the current block.

9. The method of claim 1, wherein the transform block size of the adjacent block is a first transform block size of a first adjacent block, wherein the transform partitioning flag entropy coding index value is identified based on a comparison of the first transform block size, a second transform block size of a second adjacent block available for decoding the current block, and a size of the current block.

10. An apparatus for decoding a current block from a current frame from an encoded video stream, the apparatus comprising:

a processor configured to execute instructions to:

determine, based on a transform block size of an adjacent block available for decoding the current block, a probability for entropy decoding a transform partitioning flag associated with the current block;

entropy decode the transform partitioning flag using the probability;

subsequent to entropy decoding the transform partitioning flag using the probability, generate a reconstructed block based on the current block, wherein the instructions to generate the reconstructed block based on the current block include instructions to:

responsive to a determination that the transform partitioning flag indicates that transform partitioning is omitted for the current block, generate a residual block by inverse transforming transform coefficients decoded from the encoded video stream for the current block, wherein the inverse transforming includes using a current block size inverse transform; and generate the reconstructed block based on the residual block; and output the reconstructed block within an output video stream.

11. The apparatus of claim 10, wherein the instructions include instructions to:

determine whether the transform partitioning flag indicates transform partitioning for the current block.

12. The apparatus of claim 11, wherein the instructions to generate the reconstructed block based on the current block include instructions to:

responsive to a determination that the transform partitioning flag indicates transform partitioning for the current block, generate the residual block by inverse transforming transform coefficients decoded from the encoded video stream for respective sub-blocks from the current block, wherein each sub-block of the respective sub-blocks has a sub-block size that is smaller than a size of the current block, wherein the inverse transforming includes using sub-block size inverse transforms.

13. The apparatus of claim 12, wherein, responsive to the determination that the transform partitioning flag indicates transform partitioning for the current block, wherein the instructions to generate the reconstructed block based on the current block include instructions to:

determine a second probability for entropy decoding a second transform partitioning flag for a current sub-block from the sub-blocks, based on a second transform block size of a second adjacent block that is available for decoding the current sub-block;

entropy decode the second transform partitioning flag from the encoded video stream using the second probability;

generate a reconstructed sub-block based on the current sub-block; and include the reconstructed sub-block in the reconstructed block.

14. The apparatus of claim 13, wherein the instructions include instructions to:

determine whether the second transform partitioning flag indicates transform partitioning for the current sub-block.

15. The apparatus of claim 14, wherein the instructions to generate the reconstructed sub-block based on the current sub-block include instructions to:
  responsive to a determination that the second transform partitioning flag indicates transform partitioning for the current sub-block:
    identify second sub-blocks from the current sub-block, wherein each sub-block from the second sub-blocks has a respective second sub-block size that is smaller than the sub-block size; and
    generate the residual block by inverse transforming transform coefficients decoded from the encoded video stream for the respective sub-blocks from the second sub-blocks, wherein the inverse transforming includes using second sub-block size inverse transforms; and
  responsive to a determination that the second transform partitioning flag indicates that transform partitioning is omitted for the current sub-block:
    generate the residual block by inverse transforming transform coefficients decoded from the encoded video stream for the current sub-block using a sub-block size inverse transform; and
    generate the reconstructed sub-block based on the residual block.

16. The apparatus of claim 10, wherein the instructions to determine the probability for entropy decoding the transform partitioning flag associated with the current block include instructions to:
  identify the probability based on a comparison of the transform block size and a size of the current block.

17. The apparatus of claim 10, wherein the instructions to determine the probability for entropy decoding the transform partitioning flag associated with the current block include instructions to:
  select the probability from a lookup table based on a transform partitioning flag entropy coding index value, wherein the transform block size of the adjacent block is a first transform block size of a first adjacent block, wherein the transform partitioning flag entropy coding index value is identified based on a comparison of the first transform block size, a second transform block size of a second adjacent block available for decoding the current block, and a size of the current block.

18. An apparatus, comprising:
  a memory; and
  a processor configured to execute instructions stored in the memory to:
    determine whether a transform partitioning flag for a current block indicates transform partitioning for the current block, wherein the current block is a residual block from a current frame of an encoded video stream;
    responsive to a determination that the transform partitioning flag for the current block indicates transform partitioning for the current block:
      identify sub-blocks from the current block, wherein each sub-block from the sub-blocks has a respective sub-block size that is smaller than a size of the current block; and
      generate a reconstructed block by multiform transform partition coding at least some of the sub-blocks using each respective sub-block of the sub-blocks as the current block; and
    responsive to a determination that the transform partitioning flag for the current block indicates that transform partitioning is omitted for the current block:
      generate the reconstructed block by inverse transforming transform coefficients decoded from the encoded video stream for the current block, wherein the inverse transforming includes using a current block size inverse transform; and
      output the reconstructed block within an output video stream.

19. The apparatus of claim 18, wherein the instructions include instructions to:
  determine, based on a transform block size of an adjacent block available for decoding the current block, a probability for entropy decoding the transform partitioning flag for the current block;
  entropy decode the transform partitioning flag using the probability; and
  determine whether the transform partitioning flag for the current block indicates transform partitioning for the current block subsequent to entropy decoding the transform partitioning flag using the probability.

* * * * *